United States Patent
Lindeboom et al.

Patent Number: 5,828,203
Date of Patent: Oct. 27, 1998

[54] BATTERY CHARGER WITH CHARGING CURRENT VARIATION BASED ON A TEMPERATURE DIFFERENCE BETWEEN THE BATTERY AND ITS ENVIRONMENT

[75] Inventors: Wieger Lindeboom; Oedilius J. Bisschop, both of Drachten, Netherlands

[73] Assignee: U.S. Philips Corporation, New York, N.Y.

[21] Appl. No.: 923,136

[22] Filed: Sep. 4, 1997

[30] Foreign Application Priority Data

Sep. 5, 1996 [EP] European Pat. Off. ............. 96202474

[51] Int. Cl.⁶ ..................................... H02J 7/04
[52] U.S. Cl. ............................................. 320/150
[58] Field of Search ...................... 320/125, 128, 320/136, 144, 150, 152, 153, 134

[56] References Cited

U.S. PATENT DOCUMENTS

| | | | |
|---|---|---|---|
| 3,599,071 | 8/1971 | Enghien | 320/150 |
| 4,816,737 | 3/1989 | Delmas et al. | 320/35 |
| 5,101,315 | 3/1992 | Ishikawa et al. | 361/24 |
| 5,574,355 | 11/1996 | McShane et al. | 320/161 |

*Primary Examiner*—Edward H. Tso
*Attorney, Agent, or Firm*—Ernestine C. Bartlett; Leroy Eason

[57] ABSTRACT

A battery charger whose charging current is shut off on the basis of the temperature difference between the ambient temperature, measured by means of a first sensor ($R_A$), and the battery temperature, measured by means of a second sensor ($R_B$). The error in the measurement of the temperature difference, which is caused by the input voltage dependent heat generation by the power supply (PS) in the battery charger, is compensated by a third signal ($k*V_i$) which is representative of the anticipated additional heat generation as a result of a varying input voltage ($V_i$).

9 Claims, 2 Drawing Sheets

5,828,203

BATTERY CHARGER WITH CHARGING CURRENT VARIATION BASED ON A TEMPERATURE DIFFERENCE BETWEEN THE BATTERY AND ITS ENVIRONMENT

BACKGROUND OF THE INVENTION

The invention relates to a battery charger for charging a rechargeable battery, comprising:

means for converting an input voltage into a charging current for charging the battery;

a first sensor for generating a first signal which is representative of the ambient temperature of the battery;

a second sensor for generating a second signal which is representative of the internal temperature of the battery;

means for varying the charging current in response to a difference between the first signal and the second signal.

Such a battery charger is known from U.S. Pat. No. 4,816,737 and can be used inter alia in electrical appliances with rechargeable batteries, such as for example shavers. This type of battery charger can be used as a quick charger, enabling charging with a comparatively large charging current. Charging of the battery is stopped or a change-over is made from quick charging to trickle charging as soon as the temperature of the battery to be charged increases with respect to the ambient temperature. Indeed, once the battery is fully charged its temperature increases fairly rapidly if the charging process is not stopped in due time. The first sensor measures the ambient temperature and is arranged at a location suited for this purpose. The second sensor measures the temperature of the battery and for this purpose it is in thermal contact with the battery. At a given temperature difference between the two sensors charging is stopped or a change-over is made from quick charging to trickle charging.

The means for converting the input voltage have a certain efficiency and they also become warm during charging of the battery. The generated heat causes an additional rise in ambient temperature. The generated heat depends on the input voltage. The generation of heat generally increases as the input voltage increases. During charging the environment also warms up and the temperature difference between the battery and its environment no longer forms a correct shut-off criterion. In order to ensure that the battery is never overcharged, the shut-off point of the battery charger should be dimensioned for the temperature difference which occurs at the maximum additional rise in ambient temperature which occurs as a result of the heat generation in the means for conversion. This means that at input voltages at which less heat is developed, i.e. generally at low input voltages, charging is stopped prematurely and the battery is never charged for 100%.

SUMMARY OF THE INVENTION

It is an object of the invention to mitigate this drawback. For this purpose, according to the invention, the battery charger of the type defined in the opening paragraph is characterized in that the battery charger further comprises:

means for generating a third signal which is representative of the input voltage; and means for influencing the difference between the first signal and the second signal in response to the third signal.

The third signal is a measure of the anticipated additional heat generation and is used to compensate the temperature difference measured by means of the first and the second sensor for the rise in ambient temperature as a result of this additional heat generation.

The third signal can be generated in various manners, for example by means of a temperature sensor arranged on a heat-generating part of the power supply of the battery charger. An embodiment in which the heat generation is measured in a different manner is characterized in that the means for generating comprise a voltage divider to be connected to the input voltage, which voltage divider has a tap for supplying the third signal.

This embodiment is very simple and suitable for the present purpose because the heat generation in the power supply is related to the voltage difference between the battery and the input voltage. This is particularly so for battery chargers whose input voltage is a rectified AC mains voltage.

The manner in which the third signal is used to compensate for the temperature difference depends on the configuration of the electric circuit. It is possible to process the signals from the first and the second sensor into a difference signal and to combine this difference signal with the third signal. Another possibility is to first combine the third signal with the signal from one of the sensors and then process it into a difference signal. If the first and the second sensor are included in a bridge arrangement it is advantageous to couple one of the two sensors to the tap of said voltage divider. For the first and the second sensor temperature-dependent resistors can be used, preferably having a negative temperature coefficient.

These and other aspects of the invention will be described with reference to the accompanying drawings, in which

BRIEF DESCRIPTION OF THE DRAWINGS

In these Figures parts or elements having the same function or purpose bear the same reference symbols.

DESCRIPTION OF THE PREFERRED EMBODIMENTS

Figure 1:
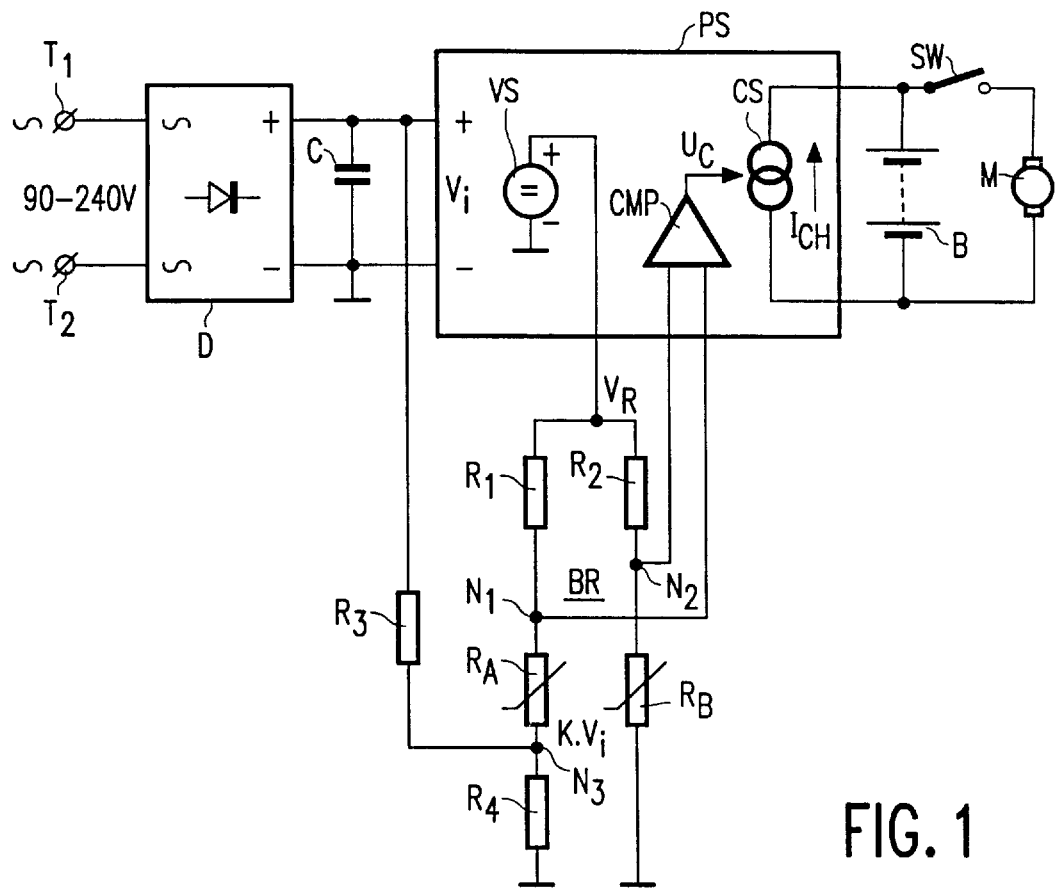
FIG. 1 shows an embodiment of a battery charger in accordance with the invention.

FIG. 1 shows an embodiment of a battery charger in accordance with the invention. The battery B is charged by means of a power supply PS, which converts an input voltage $V_i$ into a charging current $I_{CH}$. The input voltage $V_i$ can be an arbitrary variable direct voltage. The negative input voltage terminal functions as a signal reference and is connected to signal ground. The input voltage $V_i$ is, for example, a rectified mains voltage which is applied to the terminals $T_1$ and $T_2$ and which is rectified by means of a rectifier D and smoothed by means of a capacitor C. The power supply PS can be a power supply of any desired type, for example a switched-mode power supply or a DC/DC converter, by means of which a charging current $I_{CH}$ can be generated whose effective current intensity can be varied by means of a control signal $U_C$ between a large value for quick charging and a small value for trickle charging of the battery B. Another possibility is to switch the charging current $I_{CH}$ on and off by means of the control signal $U_C$. This is shown symbolically with the aid of a controllable current source CS controlled by the control signal $U_C$. The control signal $U_C$ is supplied by a comparator CMP having one input connected to a node $N_1$ between a resistor $R_1$ and a first temperature-dependent resistor or sensor $R_A$ and having another input connected to a node $N_2$ between a resistor $R_2$ and a second temperature-dependent resistor or sensor $R_B$. The resistor $R_A$ measures the ambient temperature and is preferably a resistor having a negative temperature coefficient (NTC). The resistor $R_A$ can, for example, be in thermal contact with the printed circuit board which accommodates all the components of the power supply PS. The resistor $R_B$ is thermally coupled to the battery B, measures the temperature of the battery B and is preferably also a resistor having a negative temperature coefficient. The resistors $R_1$ and $R_2$ are connected to a voltage source VS which supplies a stable reference voltage $V_R$ relative to ground. The resistor $R_B$ is connected directly to ground and the resistor $R_A$ is connected to a tap $N_3$ of a voltage divider $R_3$–$R_4$ connected across the input voltage $V_i$. A fraction $k*V_i$ of the input voltage $V_i$ appears on the tap $N_3$. The voltage on the tap $N_3$ is consequently a signal which is a measure of the input voltage $V_i$.

The battery B forms part of an electrical appliance, for example a shaver having a drive motor M connected to the battery B via a switch SW. It is obvious that the invention can also be used in other appliances with rechargeable batteries, such as electric toothbrushes, drills and other tools, audio/video/computer equipment, portable telephones etc.

The resistors $R_1$, $R_A$, $R_2$ and $R_B$ form a bridge arrangement BR. The temperature of the battery B rises comparatively rapidly when the battery is fully charged. The bridge arrangement BR has been dimensioned in such a manner that the output voltage $U_C$ of the comparator CMP then changes over and the current source CS is changed over from quick charging to trickle charging or is turned off. This prevents the battery B from being overcharged and breaking down.

The power supply PS has a certain efficiency and generates more heat as the mains voltage increases, thereby influencing the ambient temperature. This influence is measured by the resistor $R_A$ but hardly affects the temperature of the battery B owing to the short period of time of the charging process. As a result of this, the temperature difference measured by the bridge BR is no longer a correct criterion for the termination of the charging process of the battery B. The error increases as the mains voltage increases because the heat generation by the power supply increases as the mains voltage increases. By connecting the NTC resistor $R_A$, which measures the ambient temperature, to the tap $N_3$ a compensation is obtained for the heat generation as a result of the increasing mains voltage. The higher voltage $k*V_i$ on the tap $N_3$ of the voltage divider $R_3$–$R_4$ compensates for the lower voltage across the warmer NTC resistor $R_A$, as a result of which the change-over from quick charging to trickle charging is now effected after a rise in battery temperature similar to that at lower mains voltages.

Figure 2:
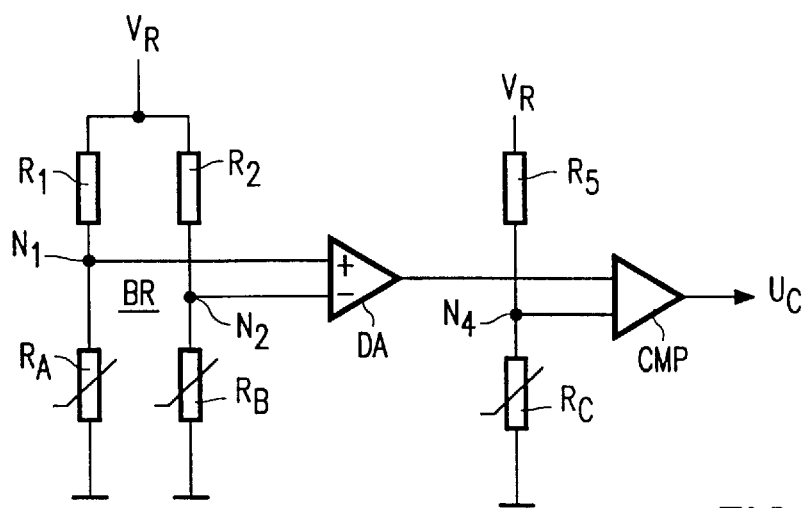
FIG. 2 shows an alternative embodiment of a battery charger in accordance with the invention.

FIG. 2 shows a variant in which the bridge BR is connected to a differential amplifier DA having its output connected to one input of the comparator CMP. The other input of the comparator CMP is connected to a node $N_4$ between a resistor $R_5$ and a third temperature-dependent resistor or sensor $R_C$, which in series with the resistor $R_5$ is connected between the reference voltage $V_R$ and ground. The resistor $R_A$ of the bridge BR is now connected directly to ground. The resistor $R_C$ is thermally coupled to a part of the power supply PS whose heat generation is representative of the magnitude of the input voltage $V_i$.

It is to be noted that it is also possible to generate a temperature difference signal in another manner than by means of a bridge arrangement. This is possible, for example, by means of separate sensors for the ambient temperature and the battery temperature, whose signals are amplified via separate electronic circuits and are processed into either an analog or a digital difference signal, the difference signal being compensated by a third signal which is a measure of the input voltage or of the anticipated temperature rise as a result of additional heat generation in the power supply of the battery charger.

Figure 3:
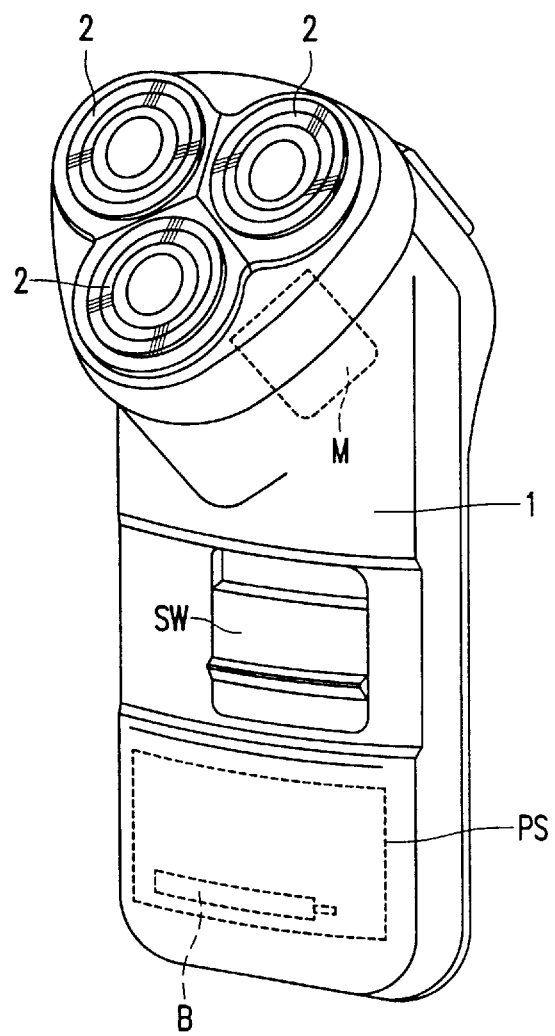
FIG. 3 shows an electric shaver with rechargeable batteries and a battery charger in accordance with the invention.

FIG. 3 shows an electric shaver having a housing 1, which accommodates the drive motor M, which drives three rotary shaving heads 2, the power supply PS and the rechargeable battery B. The motor M is switched on by means of the switch SW on the housing 1.

We claim:

1. A battery charger for charging a rechargeable battery, comprising:

power supply means (PS) for converting a supplied input voltage (Vi) into a charging current for the battery, said conversion generating heat which raises the ambient temperature of the battery, the generated heat increasing as the supplied input voltage (Vi) increases;

a first sensor for generating a first signal which is representative of the ambient temperature of the battery;

a second sensor for generating a second signal which is representative of the internal temperature of the battery; and means for changing the charging current produced by said power supply means (PS) in accordance with the difference between the first and second signals;

characterized in that said battery charger further comprises:

means for generating a third signal which is representative of the supplied input voltage (Vi); and means for modifying the difference between the first and second signals in accordance with said third signal, so as to compensate for a change in ambient temperature of the battery due to heat generated by conversion of the supplied input voltage (Vi) into charging current for the battery.

2. A battery charger as claimed in claim 1, wherein one of the first and second sensors is coupled to the tap of said voltage divider.

3. A battery charger as claimed in claim 1, wherein the power supply means (PS) and the battery are both on a common support, and the ambient temperature of the battery is determined by said first sensor by measuring the temperature of said support.

4. A battery charger as claimed in claim 1, wherein the means for generating said third signal comprise a voltage divider to which the input voltage (Vi) is applied, which voltage divider has a tap at which the third signal is produced.

5. A battery charger as claimed in claim 1, wherein the first and second sensors are connected so as to form a bridge arrangement.

6. A battery charger as claimed in claim 1, wherein the first sensor is a resistor having a negative temperature coefficient, which resistor is in thermal contact with the environment of the battery.

7. A battery charger as claimed in claim wherein the second sensor is a resistor having a negative temperature coefficient, which resistor is in thermal contact with the battery.

8. A battery charger as claimed in claim 1, wherein the input voltage (Vi) is a rectified AC mains voltage.

9. A shaver comprising: a shaving mechanism, a motor for driving the shaving mechanism, a rechargeable battery for supplying current to the motor, and a battery charger as claimed in claim 1 for charging the battery.

* * * * *